UNITED STATES PATENT OFFICE.

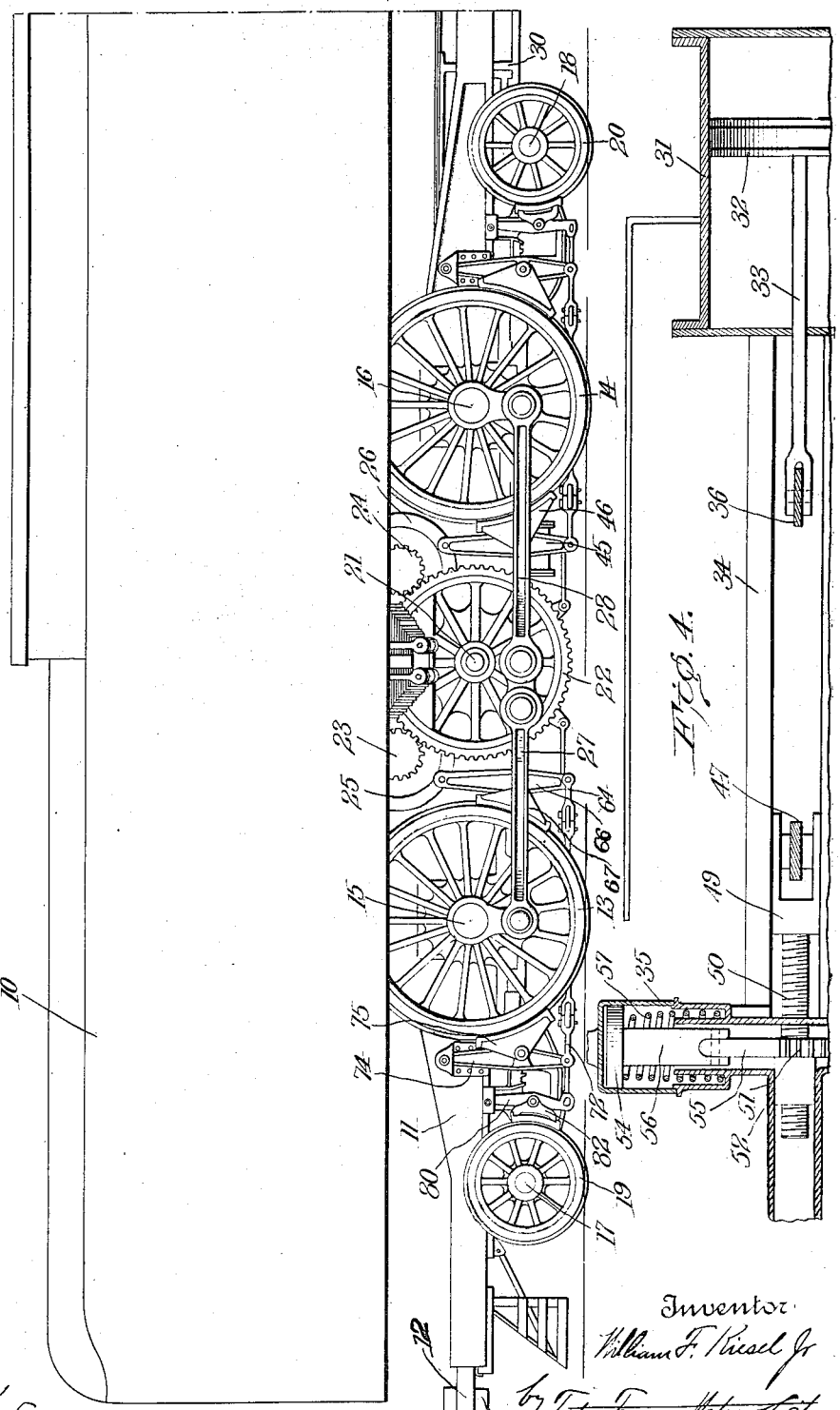

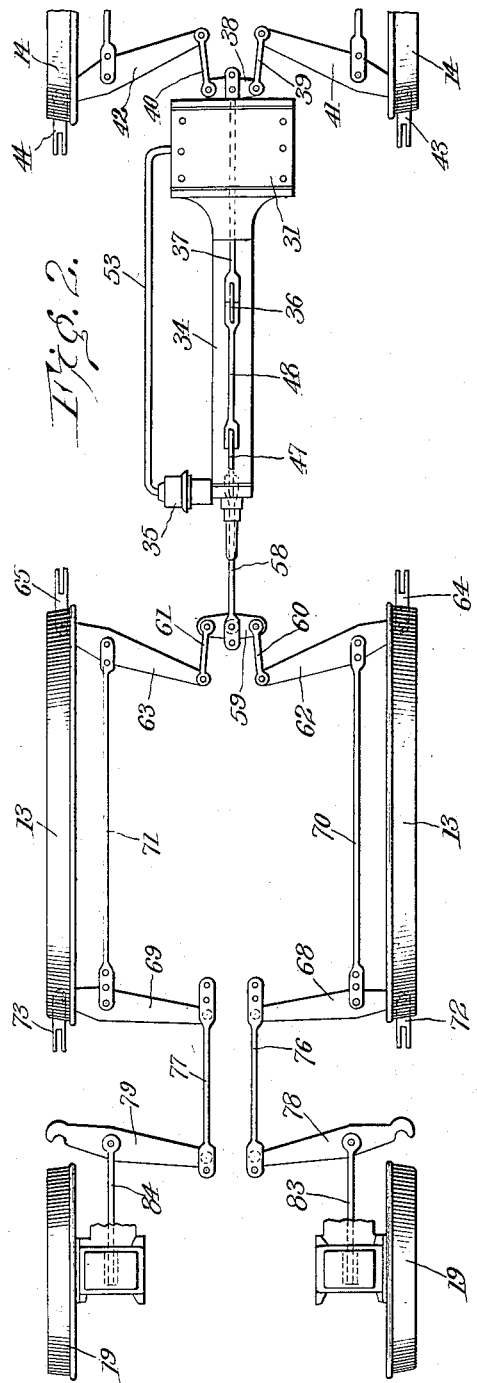

WILLIAM F. KIESEL, JR., OF ALTOONA, PENNSYLVANIA.

BRAKE-RIGGING.

1,169,968.   Specification of Letters Patent.   Patented Feb. 1, 1916.

Application filed August 29, 1914. Serial No. 859,221.

*To all whom it may concern:*

Be it known that I, WILLIAM F. KIESEL, Jr., a citizen of the United States, residing at Altoona, Blair county, State of Pennsylvania, have invented certain new and useful Improvements in Brake-Rigging, of which the following is a specification.

My invention relates to locomotives and particularly to an improved brake rigging for electric locomotives.

On account of the size of the electric motors, the space for the brake rigging is very limited, consequently the ordinary arrangement of the brake devices is changed and the main brake levers are placed horizontally.

The primary object of my invention is to provide an improved braking mechanism suitable for the limited space afforded, whereby a plurality of driving wheel clasp brakes used in conjunction with pony truck and trailer truck brakes, are all operated by one cylinder and with one system of brake levers.

Another object of my invention is to provide adequate means for automatically taking up the slack of the brake, due to worn shoes and wheel tires, and to provide a novel lever arrangement in connection with the slack adjuster and the brake cylinder.

The above and other objects and the novel features of my invention will be apparent from the following description taken in connection with the drawings, in which, Figure 1 is a side elevation of substantially one half of an electric locomotive embodying my invention; Fig. 2 is a plan view on a larger scale illustrating the arrangement of the brake rigging; Fig. 3 is a side elevation of the brake rigging, parts of the frame, wheels, etc., being shown in outline; and Fig. 4 is a horizontal sectional view showing the arrangement of the primary levers with respect to the slack adjuster.

Referring to the drawings and particularly to Fig. 1, each half of the truck of the electric locomotive or engine which supports the cab 10 consists of parallel side frame members 11 extending along the under sides of the cab or body 10, the frame members being connected at their forward and at their rear ends by draft appliances 12. The side frame members 11 comprising each half of the engine have two pairs of driving wheels 13 and 14 mounted on the axles 15 and 16, which are carried by the frame members. At the outer sides of the axles 15 and 16 the truck frame carries the pony truck axles 17 and 18 upon the ends of which the pairs of pony truck wheels 19 and 20, respectively, are mounted. A jack shaft 21 is located between and substantially in line with the driver axles 15 and 16 and substantially in line with a center line through the draft rigging. The jack shaft 21 carries a gear wheel 22 at its opposite ends, the said gear wheels meshing with the pairs of pinions 23 and 24 on the axles of the motors 25 and 26 respectively. Each of the gear wheels 22 is connected by suitable connecting rods 27 and 28 with the pairs of driver wheels 13 and 14, respectively.

The draw bar pull on the locomotive takes effect through the center line of the draft rigging and about 34½ inches above the rail level, and I have made provision approximately at the point 30 below the transverse center line of the cab or body where the two engine halves abut to transfer buffing and tension strains in line with the draw bar.

In co-pending applications Serial Nos. 857,718, 857,719 and 857,720, all filed August 20, 1914, I have shown and described the manner of supporting the body 10 on the truck, the manner of connecting and transferring weight to the pony truck wheels so that the weight on each of the latter will be substantially one half the weight on each driver wheel, and the manner of fitting the jack shaft 21 in place in the side frame members 11.

Associated with the brake rigging for the eight wheels mounted on the truck frame beneath each half of the engine body is a brake cylinder 31 of the usual Westinghouse type. Each cylinder is equipped with a piston 32 and a piston rod 33. A tubular portion 34 extends from one end of the cylinder and has an automatic slack adjuster 35 mounted at its outer end. On account of the size of the motors 25 and 26 the space for the brake is very limited, and because of the location of the jack shaft 21 substantially in line with the center line through the draft rigging, it is necessary to locate the brake cylinder and slack adjuster beneath the jack shaft but high enough so that the rigging attached thereto will have sufficient clearance from the tops of the rails.

The primary brake lever 36, in this case being the live lever, is pivoted near its center at the end of the piston rod 33 and at its lower end is pivotally connected to a tension rod 37 which extends rearwardly and is connected to a transverse plate 38. Short rods 39 and 40 are pivotally connected at one end to the opposite ends of the plate 38 and at their other ends the rods 39 and 40 are pivotally connected to the ends of the horizontally disposed brake levers 41 and 42, respectively. At the ends of the horizontal levers 41 and 42 there are links 43 and 44 which are pivotally connected to the lower ends of brake hangers 45 pivoted on the side frame members 11. Shoes 46 are pivotally carried intermediate the ends of brake hangers 45 and engage the treads of the wheel 14.

Each live lever 36 is connected to a dead lever 47 by a compression bar 48 which joins the upper ends of the vertical live and dead levers and extends horizontally just underneath the jack shaft 21 and it is therefore substantially in line with the longitudinal center line of the draft rigging. Near its center the dead lever 47 is pivoted in a cross head 49 which works in a guideway within the tubular member 34. The cross head 49 has a screw 50 connected thereto and a ratchet wheel 51 is rotatably mounted in a continuation 52 of the tubular part and has threaded engagement with the screw 50. The cross head 49, screw 50 and ratchet wheel 51 constitute parts of the slack adjuster. When the piston 32 in the brake cylinder 31 moves more than a predetermined distance, say 6 inches, it uncovers a port leaving air pass through the pipe 53 to the cylinder of the slack adjuster causing the downward movement of the piston 54 which has a pawl 55 pivoted to the lower end of a stem 56 on the piston 54. A downward movement of the piston 54 moves the pawl 55 over the teeth of the ratchet wheel 51 and when the air pressure behind the piston 54 is removed a spring 57 surrounding the stem 56 restores the piston 54 to its initial position, the pawl 55 simultaneously rotating the ratchet wheel 51 which causes the adjustment of the screw 50 and the consequent adjustment of the lever 47 and bar 48 which connects it to the lever 36. The wear of the shoes and other parts of the brake mechanism is thus taken up automatically. The outer end of the guiding part 34 of the slack adjuster is supported from the side frame members 11.

A tension rod 58 is pivotally connected to the lower end of the dead lever 47 and to a plate 59. Short rods 60 and 61 are connected to the opposite ends of the plate 59 and to the inner ends of the first horizontally disposed levers 62 and 63 respectively. At their outer ends the levers 62 and 63 have short links 64 and 65 connected thereto whereby they are connected to the lower ends of the brake hangers 66 pivotally supported by the side frame members 11. Intermediate their ends the brake hangers 66 pivotally support brake shoes 67 which bear against the treads of the wheels 13.

The arrangement of the brake rigging from the live lever 36 outwardly is the same as the arrangement of the brake rigging from the dead lever 47 outwardly and as I have only illustrated the latter completely it will be understood that the description and illustration will be the same for both.

The first horizontally disposed levers 62 and 63 are connected to a second pair of horizontally disposed levers 68 and 69 by means of rods 70 and 71 which are pivotally connected to the levers intermediate their ends. The outer ends of the levers 68 and 69 are provided with short links 72 and 73 which are connected to the lower ends of brake hangers 74 located in line with the wheels 13 and hung from the side frame members 11. Each of the brake hangers 74 has a brake shoe 75 pivotally connected thereto and capable of engaging the tread of the wheel 13 on the side opposite the axle 15 from the shoe 67, whereby each of the driver wheels of the locomotive is equipped with a clasp brake.

The adjustable links 76 and 77 pivotally connect the inner ends of the horizontal levers 68 and 78 and the inner ends of the horizontal levers 69 and 79. The third pair of horizontal levers 78, 79 is connected to the lower ends of the brake hangers 80 mounted on the pony truck frame 81. Intermediate their ends the hangers 80 are provided with pivotally mounted shoes 82 which are capable of engaging the treads of the pony truck wheels 19. Intermediate their ends the horizontal levers 78 and 79 are pivotally connected to rods 83 and 84, respectively, which are anchored to the pony truck frame 81. The construction of the pony truck frame 81 and the manner of supporting the brake hangers thereon is shown and described in my co-pending application Serial No. 857,719. The weight on each pony truck wheel is substantially half that on each driver wheel and therefore there will be about the same intensity of pressure on each brake shoe according to the arrangement herein provided. Means for the adjustment of all the tension rods has been provided in order to avoid excessive angularity of the various levers.

On account of the limited space it has been necessary to locate both the live and dead levers on the same side of the brake cylinder, the levers being hung in a frame which at one end is attached to one cylinder head and at the other end being supported by the side frame members through the motor frame casting. This arrangement permits locating the connection 48 between the two levers 36 and 47 about in line with the top of the brake cylinder and just clearing the jack shaft 21. The tension rods 37 and 58, which are connected to the first pairs of horizontal brake levers on either side of the cylinder through the equalizing members 38 and 59, thus pass immediately underneath the cylinders and have at the same time sufficient clearance between the cylinders and the tops of the rails.

The operation of the brake rigging will be apparent from the foregoing description. The brake cylinder 31 being positioned substantially mid-way between the ends of the brake system, when operated, will cause the brake shoes on both ends of the brake system to be drawn up to the wheels in unison. The automatic slack adjuster operates to take up the slack of the brake and the novel lever arrangement in connection therewith serves to permit the use of the adjuster in the limited space under the motors.

Having thus described the invention what I claim and desire to secure by Letters Patent is:

1. In a locomotive, the combination of axles, driver wheels on each of said axles, a driving motor and gearing in the space between said axles, brake devices capable of engaging said wheels on opposite sides of said axles, and a brake cylinder between said axles beneath said motor and connected with said brake devices.

2. In a locomotive, the combination of axles, driver wheels on each of said axles, driving motors in the space between said axles, means including gearing connecting said motors to the driver wheels, brake hangers on opposite sides of said wheels, brake shoes carried by said hangers and capable of engaging the wheels on opposite sides of their centers, a brake cylinder in the space between said axles and below said motors, a piston therefor, and means connecting said piston with said brake hangers, said means being located on one side of the cylinder.

3. In a locomotive, the combination of axles, driver wheels on each of said axles, driving mechanism located between said axles, brake hangers on opposite sides of each of said wheels, brake shoes carried by said hangers and capable of engaging said wheels, a horizontal lever connected to each of said brake hangers, a cylinder located between said axles and below said driving mechanism, a piston working in said cylinder, and means connecting said piston with each of said horizontal levers.

4. In a locomotive, the combination of axles, driver wheels on each of said axles, driving mechanism located between said axles and connected to said wheels, braking means for said wheels comprising a brake cylinder located below said driving mechanism, and means below said driving mechanism for automatically adjusting the slack in the braking means.

5. In a locomotive, the combination of axles, driver wheels mounted thereon, a pair of brake hangers associated with each wheel, a brake shoe carried by each hanger and capable of engaging a driver wheel, a plurality of horizontally disposed brake levers, one for each brake hanger, a brake cylinder located between the axles, a piston working in said cylinder, a live brake lever connected to said piston and to the group of horizontal levers on one side of said cylinder, and a dead brake lever connected to said live brake lever and to the group of horizontal levers on the other side of said cylinder.

6. In a locomotive, the combination of axles, driver wheels mounted thereon, a pair of brake hangers associated with each wheel, a brake shoe carried by each hanger and capable of engaging a driver wheel, a plurality of horizontally disposed brake levers, one for each brake hanger, a brake cylinder located between the axles, a piston working in said cylinder, a live brake lever connected to said piston and to the group of horizontal levers on one side of said cylinder, and a dead brake lever connected to said live brake lever and to the group of horizontal levers on the other side of said cylinder, said live and dead levers being located on the same side of the brake cylinder.

7. In a locomotive, the combination of axles, driver wheels mounted on said axles, pony truck wheels located beyond said driver wheels, a brake hanger located on each side of said driver wheels, and a brake hanger in line with each pony truck wheel, a brake shoe on each hanger, two brake shoes being capable of engaging each of said driver wheels, and one brake shoe being capable of engaging each of said pony truck wheels, a brake operating device, and levers connecting said device to all the brake hangers whereby said device is capable of operating the brake shoes associated with the driver wheels and pony truck wheels.

8. In a locomotive, the combination of driver axles, driver wheels mounted on each of said axles, a pony truck axle located beyond each driver axle, pony truck wheels on said pony truck axles, a brake cylinder located between the driver axles, a brake lever associated with each of said wheels, and means connecting the brake levers to the piston working in said brake cylinder.

9. In a locomotive, the combination of pairs of driver wheels, axles therefor, pairs of pony truck wheels, axles therefor, a pair of brake shoes for each driver wheel and a single brake shoe for each pony truck wheel, brake operating means, levers connecting said means to said brake shoes, the arrangement being such that the brake effort exerted on each wheel is proportional to the weight thereon.

10. In a locomotive, the combination of a plurality of axles, wheels fixed on said axles, and brake means therefor comprising a brake cylinder, a piston working in said cylinder, a brake lever connected intermediate its ends with said piston, a second brake lever, slack adjusting means connected to said second brake lever, and a rod connecting said levers.

11. In a locomotive, the combination of a plurality of driver wheels, a plurality of pony truck wheels, and brake rigging for said locomotive and the wheels thereof comprising devices arranged so that the braking effort exerted on each wheel is proportional to the weight thereon and so that the braking effort exerted on the driver wheels will be in excess of that exerted on the pony truck wheels.

12. In an electric locomotive, the combination of a truck, axles mounted therein, pairs of driver wheels on said axles, electric driving mechanism connected to said wheels, draft rigging connected to the truck, and brake rigging for said truck comprising primary brake levers located beneath said electric driving mechanism below a center line through said draft rigging.

13. In a locomotive, the combination of a truck, axles mounted therein, pairs of wheels mounted on said axles, and brake rigging for said truck comprising a brake cylinder provided with a piston and piston rod, a live brake lever pivoted intermediate its ends on said rod, a pivoted dead brake lever, said levers being located on the same side of said cylinder, and slack adjusting means connected to one of said levers to adjust the distance between the pivots of said levers.

14. In a locomotive, the combination of a truck frame, a plurality of axles mounted therein, driver wheels mounted on said axles, motors mounted on said frame, draft rigging connected to said frame, a jack shaft located substantially in line with a center line through said draft rigging, means connecting said jack shaft and motors, means connecting said jack shaft and driver wheels, and brake rigging comprising a live brake lever, a dead brake lever, a brake cylinder, a piston working therein, and means connecting said brake levers to the piston, said levers, cylinder, piston and connections being located beneath the jack shaft.

15. In a railway vehicle, the combination of axles, pairs of wheels on said axles, braking means associated with said wheels and including a brake cylinder, and live and dead levers located on the same side of said cylinder and having parts intermediate their ends pivotally mounted in the axis of said cylinder.

16. In an electric locomotive, the combination with driver and pony truck axles, of wheels mounted on said axles, electric driving mechanism in the space between said driver axles, a brake shoe for each of said wheels, a brake operating device below said electric driving mechanism, and levers connecting said device to all of the brake shoes whereby said device is capable of operating the brake shoes on the driver and pony truck wheels.

In testimony whereof I affix my signature in presence of two witnesses.

WILLIAM F. KIESEL, Jr.

Witnesses:
W. R. Forster,
James T. Hanlon.